(12) United States Patent
Simon et al.

(10) Patent No.: US 7,200,599 B2
(45) Date of Patent: Apr. 3, 2007

(54) AUTOMATED GENERATOR OF INPUT-VALIDATION FILTERS

(75) Inventors: Daniel R. Simon, Redmond, WA (US); Valentin N. Razmov, Seattle, WA (US); Jonathan D. Pincus, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 955 days.

(21) Appl. No.: 09/887,524

(22) Filed: Jun. 21, 2001

(65) Prior Publication Data

US 2003/0037236 A1    Feb. 20, 2003

(51) Int. Cl.
*G06F 17/30* (2006.01)

(52) U.S. Cl. .......................... 707/100; 707/102; 707/3; 707/6; 707/10

(58) Field of Classification Search ........ 707/100–102, 707/3, 10, 4, 2, 5, 6; 715/513, 511, 523
See application file for complete search history.

(56) References Cited

U.S. PATENT DOCUMENTS

| | | | |
|---|---|---|---|
| 6,085,196 A * | 7/2000 | Motoyama et al. | 707/102 |
| 6,558,431 B1 * | 5/2003 | Lynch et al. | 715/513 |
| 6,605,120 B1 * | 8/2003 | Fields et al. | 715/513 |
| 6,732,102 B1 * | 5/2004 | Khandekar | 707/10 |

* cited by examiner

*Primary Examiner*—Cam-Y Truong
(74) *Attorney, Agent, or Firm*—Lee & Hayes, PLLC

(57) ABSTRACT

An implementation of a technology, described herein, for facilitating the automated generation of input-validation software filters. The implementation of the invention provides an easy graphical user interface (GUI). With this GUI, a user (such as a system administrator) is able to quickly enter a set of parameters defining what valid inputs constitute—in particular, when such inputs come from a computing component. Consequently, the user does not have to manually generate filtering instructions on how to filter input from a computing component. This abstract itself is not intended to limit the scope of this patent. The scope of the present invention is pointed out in the appending claims.

30 Claims, 3 Drawing Sheets

AUTOMATED GENERATOR OF INPUT-VALIDATION FILTERS

TECHNICAL FIELD

This invention generally relates to a technology for facilitating the automated generation of input-validation software filters.

BACKGROUND

In some instances, it can be beneficial to constrain an application's input to only that which meets specific criteria. Such input may be created directly by a person (i.e., a human) or may be the direct product of a computing component.

Input from Humans

Ordinary forms are designed for gathering specific input from a human. For example, if a form field requires a date, the only appropriate input is a valid date (such as Jun. 20, 2001). Electronic forms exists (e.g., JetForm™), designed to limit the format and the type of input that a human enters into such forms. However, many such electronic forms are not well suited for collecting input from computing components.

Input from Computing Components

Many computing components accept input directly from other computing components. Even if the data provided by a computing component originates from a human, such data is considered input from a computing component when it is accepted directly from that component and not a human.

Broadly speaking, a computing component is one that excludes a direct human intervention. Examples of such computing components include (by way of example, but not limitation): applications, program modules, Web pages, Web servers, client computers, and mobile devices.

A prime example of input from a computing component is input accepted by a Web server from another computer (e.g., a client) over a communications network (such as the Internet). Although the bulk of such input is benign and has valid formatting, sometimes such input is accidentally or purposefully made ill-formed. Such purposeful actions may be part of a malicious attack directed by one or more attackers (i.e., interlopers).

Malicious Attacks

Malicious attackers routinely gain unauthorized access into computing systems (e.g., Web servers) by exploiting poor or non-existent filtering of input from computing components.

A malicious interloper may attack a computer system by supplying input, which can manipulate the system into performing otherwise unauthorized actions targeted at subverting the integrity of the system. Examples of such malicious attacks include buffer overruns and other forms of invalid input.

More information on these types of attacks may be found in the following articles from CERT®:
"Understanding Malicious Content Mitigation for Web Developers", CERT Coordination Center, February 2000, http ://www.cert.org/tech_tips/malicious_ code_mitigation.html and http://www.cert.org/ tech_tips/malicious_code_FAQ.html; and
"Malicious HTML Tags Embedded in Client Web Requests", CERT Coordination Center, February 2000, http ://www.cert.org/advisories/CA-2000-02.html).

Buffer Overruns

To cause a buffer overrun, an attacker sends much more data to an application (such as a Web application) than the application can handle in its buffer. Here, "much more" means more data in size than the application implicitly assumes it should be receiving. If the application does not check the length of the data received, it may simply copy it into a fixed-size array of bytes on the stack, often known as a "buffer". If the copy goes beyond the end of the buffer ("overruns" it), the application may unintentionally modify adjacent memory and potentially overwrite executable code or data, thereby causing a crash-or more sinisterly, overwrite its own code it with new executable actions to direct the computer to perform the bidding of the attacker.

This attack can be prevented if the incoming data is examined to ensure that it does not exceed a given size. However, failing to examine incoming data is typically not examined in this manner is a frequent programming mistake.

Malicious Content

Typically, Web pages contain both text and HTML (HyperText Markup Language) content that is generated by a server and interpreted by a client browser. Servers that generate static pages have full control over how the client will interpret the pages sent by that server. However, servers that generate dynamic pages do not have complete control over how their output is interpreted by the client. If malicious content is introduced into a dynamic page, neither the server nor the client has enough information to recognize that this has happened and therefore take protective actions.

In HTML, to distinguish text from markup, some characters are treated in a special manner. The grammar of HTML determines the significance of "special" characters—different characters are special at different points in the document. For example, the less-than sign ("<") typically indicates the beginning of an HTML tag. Tags can either affect the formatting of the page or introduce a script program that the browser executes (e.g., the <SCRIPT> tag introduces code from a variety of scripting languages).

Many Web servers generate Web pages dynamically. For example, a search engine may perform a database search and then construct a Web page that contains the results of the search. Any server that creates Web pages by inserting dynamic data into a template should check to make sure that the to-be-inserted data does not contain any special characters (e.g., "<"). If the inserted data contains special characters, the user's Web browser is likely to mistake them for HTML markup. Because HTML markup can introduce programs, the browser could interpret some data values as HTML tags or script rather than displaying them as text.

The risk of a Web server not doing a check for special characters in dynamically generated Web pages is that in some cases an attacker can choose the data that the Web server inserts into the generated page. Then the attacker can trick the user's browser into running a program of the attacker's choice. This program will execute in the browser's security context for communicating with the legitimate Web server, not the browser's security context for communicating with the attacker. Thus, the program will execute in an inappropriate security context with similarly inappropriate privileges.

This vulnerability is sometimes described as "cross-site scripting."

Impact. Users may unintentionally execute scripts written by an attacker when they follow untrusted links in Web pages, mail messages, or newsgroup postings. Users may also unknowingly execute malicious scripts when viewing dynamically generated pages based on content provided by other users.

Because the malicious scripts are executed in a context that appears to have originated from the targeted site, the attacker may have full access to the document retrieved (depending on the technology chosen by the attacker), and may send data contained in the page back to their site. For example, a malicious script can read fields in a form provided by the real server, and then send this data to the attacker. The attacker can access restricted web sites from the client, or violate domain security policies in other ways.

The specific impact can vary greatly depending on the language selected by the attacker and the configuration of any authentic pages involved in the attack. Some not immediately obvious examples are included here.

Attacks May Come in Many Forms. Attacks may be made persistent through poisoned cookies. An attacker may access restricted web sites from the client. Domain-based security policies may be violated. The use of less-common character sets may present additional risk.

Input-Validation Filters

Since unvalidated input can cause these problems, then validating the input prevents them from occurring. A set of instructions (either to a human or to a computer) that examines input and rejects any invalid input is known as an input-validation filter. Input-validation filters for filtering input from computing components will prevent a malicious attacker from wreaking havoc in the manner described above. To validate an input, it may be filtered by the very application program that uses the input or it may be filtered before that program receives the input.

FIG. 1 shows a computer system, specifically a Web server 130, operatively coupled to a typical computer client 110 via a network 120, such as the Internet. The interloper on computer client 110 sends malicious input to the Web server 130 with hopes of infiltrating one of its applications (such as applications 134a, 134b, 134n) and/or its data.

With internalized filtering, the application programs themselves filter the input. With externalized filtering, the Web server 130 filters the input for the applications. More specifically, the input filter 132 of the server filters its input.

Internalized Filtering

Generally, software developers appear to be well positioned to write their code so that it filters incoming data to ensure that such data is valid and legal. When the application program filters its own input, then filtering is internalized. Unfortunately, most developers are focused on producing functional code rather than code resistant to such attacks; as a result, such security features are often ignored. In reality, software developers tend to be inconsistent in performing all necessary checks for validity of the inputs their applications receive.

Moreover, software developers may not actually be well positioned to write their code so that it filters incoming data to ensure that such data is valid and legal. It is unrealistic to expect the developers to know every possible form of attack on their software; new attacks are often invented, which lead to new requirements for input validation. For example, the "format string attack," as described in http://news.cnet.com/news/0-1003-200-2719802.html, was discovered in the summer of 2000. One approach to preventing this attack via input validation requires rejecting all input involving percent signs. Therefore, it is prudent practice to have a mechanism for performing additional validation checks in addition to the internal checks.

Externalized Filtering

External filtering for an application is when input into an application is filtered before the application receives the input. The filtering is performed external to the application for which the input is destined.

The prudent practice of externalized filtering may be implemented by a system administrator (or others). An administrator is well positioned to decide when performing such input validation is worthwhile. A good rule of thumb is that filtering should be done when performance considerations (e.g., the overhead incurred by the validity checks) are outweighed by the explicit need for robustness in environments, which cannot be guaranteed to be secure.

In general, externalizing the checks on the input data into a separate filter (i.e., external to the application) ensures that no assumptions (about the application's input data) specified in the filter are left unwarranted.

As illustrated in dashed box 150 (labeled "Background"), many system administrators, on their own, manually write one or more sets of filtering instructions as needed for each application. A filter (such as input filter 132) uses these instructions to filter incoming data. Sometimes the sets of filtering instructions are called "filter scripts."

The system administrator (of box 150) typically writes these sets of filter instructions in one of several specific languages. Such languages may include those traditionally known as "scripting" languages. This human (such as a system administrator) may use a traditional text-based user-interface (UI), as shown by monitor 152. Effectively, the manually written instruction set 154 becomes the input filter 132 of the server 130. Typically, a server has a mechanism (e.g., ISAPI) for invoking external filters. This mechanism may be used to invoke the instruction sets as an input filter.

External Filters

In a typical computer system, external filters, such as filter 132, are little program modules are performed on the computer system when it is started. They stay in memory until the computer system shuts down. The external filters can be configured to receive a number of special filter-event notifications that occur with each request that the computer system receives, and with each response that the computer system generates in return. They are called external filters because they are external to the applications that actually receive the input. Common examples of such external filters are "ISAPI filters."

ISAPI Filters. Internet Server API, an API for the Microsoft® Internet Information Server® (IIS) Web server. ISAPI filters are DLLs loaded into the process and they stay in memory until shut-down. After they are loaded, ISAPI filters can be configured to receive a number of special filter-event notifications that occur with each input received (e.g., HTTP request that the Web server) and with each response that the Web server generates in return.

When an ISAPI filter is loaded, the filter passes a data structure to the Web server containing, in addition to other information, a bit field that specifies the types of filter-event notifications for which the filter should be notified. Each time one of these events occurs, an event notification is started, and every ISAPI filter that is set to monitor that event is notified.

Instructions for Filtering

Herein, "instructions" are a set of commands that can be executed without user interaction. Generally, they are computer-implemented instructions. A filter language is a programming language through which one can write the instructions of a filter.

To effect input-validation filtering, many humans (such as system administrators) manually write filtering instructions, such as instruction set 154, on an ad hoc basis. These instructions examine the incoming data as it is received by the system, but before the destination applications receive that data. If the incoming data passes muster, it is forwarded on to the applications that need it.

The following are examples of instruction sets (or partial sets) that a human (such as a system administrator) may write to filter inputs:

C++ Example

```
BYTE IsBadChar[] = {
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0xFF,0xFF,0x00,0x00,0xFF,0xFF,0xFF,0xFF,0x00,0x00,
0x00,0x00,0x00,0x00,0x00,0x00,0x00,0x00,0x00,0x00,0x00,
0x00,0x00,0x00,0x00,0xFF,0xFF,0x00,0xFF,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00,0x00,0x00,0x00,0x00,0x00,0x00,0x00,0x00,
0x00,0x00,0x00
};

DWORD FilterBuffer(BYTE * pString, DWORD cChLen) {
        BYTE * pBad  = pString;
        BYTE * pGood = pString;
        DWORD i=0;
        if (!pString) return (0);
        for (i=0; pBad[i]; i++) {
                if (!IsBadChar[pBad[i]])
                        *pGood++ = pBad[i];
        }
        return (pGood – pString);
}
```

JavaScript Example

```
function RemoveBad(InStr){
   InStr = InStr.replace(/\</g, "");
   InStr = InStr.replace(/\>/g, "");
   InStr = InStr.replace(/\"/g, "");
   InStr = InStr.replace(/\'/g, "");
   InStr = InStr.replace(/\%/g, "");
   InStr = InStr.replace(/\;/g, "");
   InStr = InStr.replace(/\(/g, "");
   InStr = InStr.replace(/\)/g, "");
```

```
    InStr = InStr.replace(/\&/g, "");
    InStr = InStr.replace(/\+/g, "");
    return InStr;
}
```

Perl Example

```
#! The first function takes the negative approach.
#! Use a list of bad characters to filter the data
sub FilterNeg {
    local( $fd ) = @_;
    $fd =~ s/[\<\>\"\'\\%\;\)\(\&\+]//g;
    return( $fd ) ;
}

#! The second function takes the positive approach.
#! Use a list of good characters to filter the data
sub FilterPos {
    local( $fd ) = @_;
    $fd =~ tr/A-Za-z0-9\ //dc;
    return( $fd ) ;
}

$Data = "This is a test string<script>";
$Data = &FilterNeg( $Data );
print "$Data\n";

$Data = "This is a test string<script>";
$Data = &FilterPos( $Data );
print "$Data\n";
```

Shortcomings of Manually Generated Filter Instructions

Although the manual generation of input-validation sets of filter instructions does address the ills inflicted by the malicious attacks described above, it does so at the expense of additional manpower. Most humans (such as system administrators) are hard-pressed to find resources (e.g. time) to research and write customized instructions for each separate application receiving input and for each corresponding variety of malicious attacks.

This conventional, manual, ad hoc solution to the problem is slow and inefficient: each human (such as a system administrator) must manually write a filtering instruction for each need. Such a programming practice is inherently slow, tedious, and error-prone.

What is needed is an automated approach for generating filtering instruction sets based upon what the human (such as a system administrator) defines as valid input data and valid parameters of such data for a specific application. This way, the human (such as a system administrator) can avoid the time and expense of manually writing filtering code like the one shown above.

SUMMARY

Described herein is a technology for facilitating the automated generation of input-validation software filters. At least one of the implementations, described herein, provides a convenient graphical user interface (GUI). With this GUI, a user (such as a human (such as a system administrator)) is able to quickly enter a set of parameters defining valid inputs. Conversely, the parameters may define invalid input. From the entered parameters, the implementation automatically generates input-validation filters for filtering input from computing components. With this implementation, the user does not manually generate filtering instructions per se—she only specifies a high-level description of what should be filtered, not how; thus, the user does not need to be familiar with any specific filtering language.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

In the following description, for purposes of the explanation, specific numbers, materials and configurations are set forth in order to provide a thorough understanding of the present invention. However, it will be apparent to one skilled in the art that the present invention may be practiced without the specific exemplary details. In other instances, well-known features are omitted or simplified to clarify the description of the exemplary implementations of present invention, and thereby better explain the present invention. Furthermore, for ease of understanding, certain method steps are delineated as separate steps; however, these separately delineated steps should not be construed as necessarily order-dependent in their performance.

The following description sets forth one or more exemplary implementations of an Automated Generator of Input-Validation Filters that incorporate elements recited in the appended claims. These implementations are described with specificity in order to meet statutory written description, enablement, and best-mode requirements. However, the description itself is not intended to limit the scope of this patent.

The inventors do not intend these exemplary implementations to limit the scope of the present invention. Rather, inventors have contemplated that the present invention might also be embodied and implemented in other ways, in conjunction with other present or future technologies.

An example of an embodiment of an Automated Generator of Input-Validation Filters may be referred to as an "exemplary filter generator."

Overview

Figure 3:
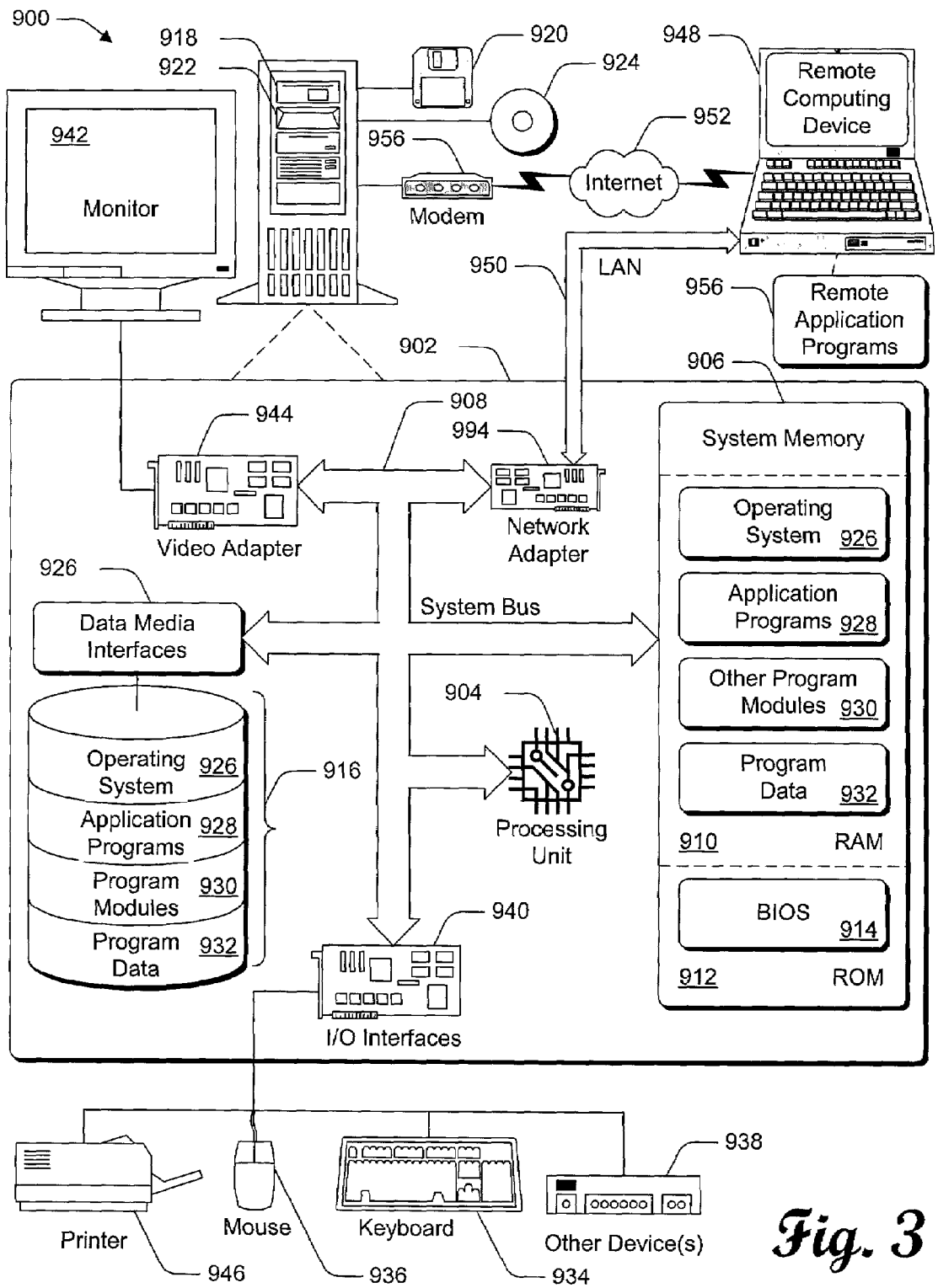
FIG. 3 is an example of a computing operating environment capable of implementing an embodiment (wholly or partially) of the invention herein.

The one or more exemplary implementations, described herein, of the present invention may be implemented (in whole or in part) by a filter generation system 170 and/or by a computing environment like that shown in FIG. 3.

The exemplary filter generator automatically generates input-validation filters for filtering input from computing components. In at least one implementation, it generates an input-validation filter from a set of automatically generated filtering instructions. These instructions are automatically generated from information provided by a user (such as a human (such as a system administrator)). That information identifies what constitutes the definition of valid input data and valid parameters of such data for specific applications. Typically, the user provides this information via a graphical user interface (GUI). What constitutes valid input data and its valid parameters may be determined by the user, provided by a specific application, and/or provided by a third party.

With the exemplary filter generator, filtering instructions are automatically generated based upon a given set of assumptions on the parameters extracted from the input. The parameter boundaries define how the incoming data is to be parsed.

A graphical UI defines both the parameter boundaries and the assumptions each extracted parameter should satisfy. Using this graphical UI, the user defines the parameter boundaries and assumptions for a to-be-generated filter instruction sets.

These parameter boundaries and assumptions are persisted into description-representation data structures. An XML data structure is an example of one such description-representation data structure.

The filtering instructions are automatically generated from the persisted description-representation data structures. Typically, the resulting filter instructions are employed in the same manner as the conventional, manually written filter instructions described above in the "Background" section. That is, the data incoming into a specific application is filtered (using the filter instructions) before the data is passed along to the application.

Two points at which the exemplary filter generator is particularly helpful is 1) during initial installation and setup of an application; and/or 2) when it is necessary to quickly deploy a fix (i.e., a patch) to a security hole for an application.

Applications for the resulting filters—which are automatically generated by the exemplary filter generator—include (but are not limited to) input-validation filtering, firewall filtering, and API (application programming interface) wrapper filtering.

Exemplary Filter Generating System

Figure 1:
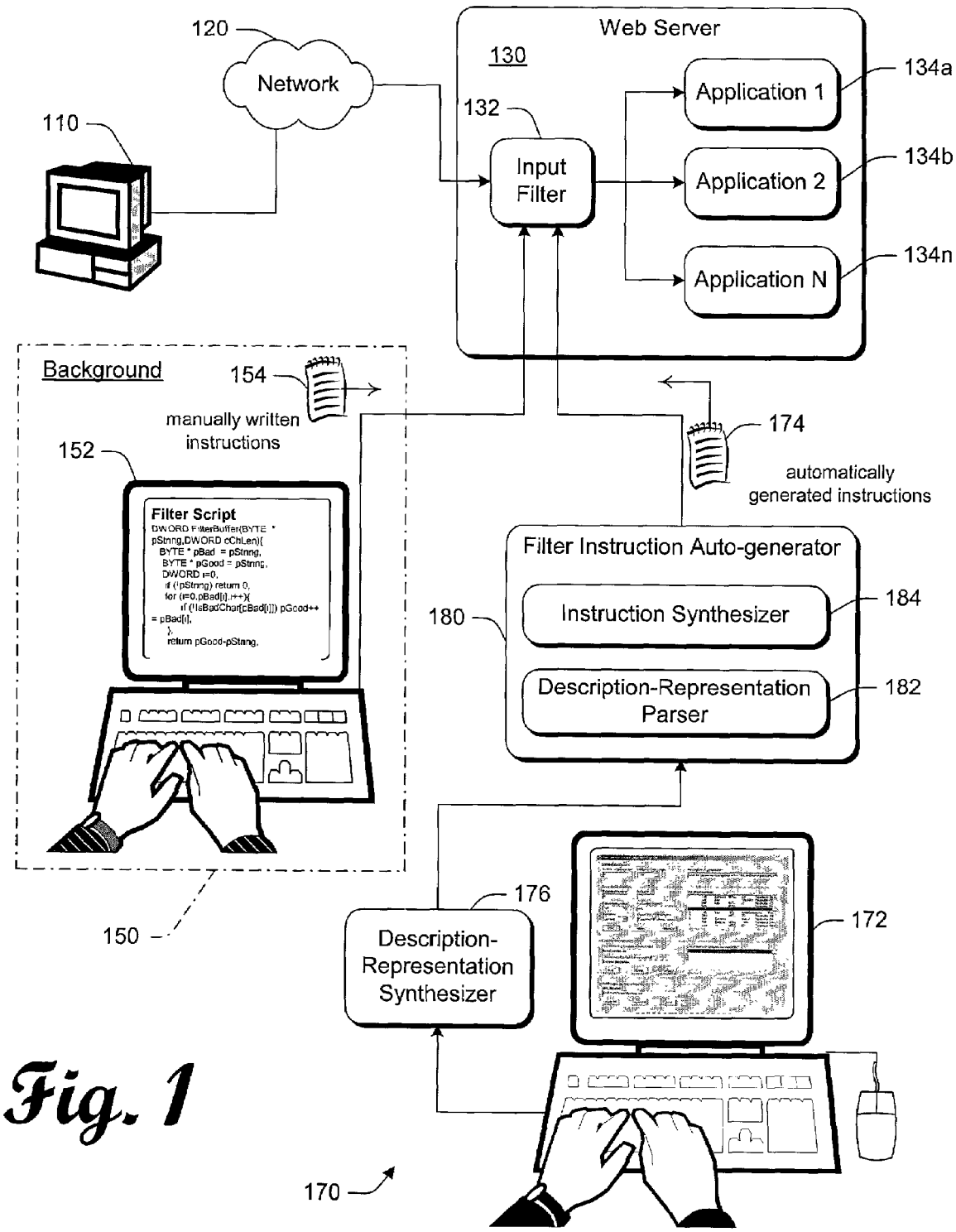
FIG. 1 is a block diagram showing an example environment in which input filters are employed. It shows a pictorial representation of the conventional mechanism for manually creating filtering instructions. It also shows a pictorial representation of an embodiment of the invention herein.

FIG. 1 shows the Web server 130 operatively coupled to the client 110 via the Internet 120. The interloper on client 110 sends malicious input to the Web server 130 with hopes of infiltrating one of its applications (such as applications 134a, 134b, 134n). With externalized filtering, such as that provided by input filter 132, the Web server 130 filters the input for the applications. The input filter 132 executes the set of filter instructions generated by the exemplary filter generator.

FIG. 1 shows the filter generation system 170. As its name suggests and like the conventional solution (shown in FIG. 1 at background 150), the filter generation system 170 generates filter instructions, such as instruction 174, and loads those instructions into an externalized filter, such as input filter 132.

The filter generation system 170 includes four main components: a graphical user-interface (UI) 172; a description-representation ("DR") synthesizer 176; a description-representation ("DR") parser 182; and an instruction synthesizer 184. These components are listed following the data flow. User enters data at the graphic UI 172. Data flows through and is processed by the DR synthesizer 176, the DR parser 182, and the instruction synthesizer 184, in that order. Processed data, in the form of filter instructions, flows out of the instruction synthesizer 184.

For additional implementation details on the components of the exemplary filter generator and the description-representations, see the section below titled "Other Implementation Details".

Graphical UI

The graphical UI 172 is a tool that aids in the generation of a description representation of both parameter boundaries and assumptions on parameters. With this UI 172, the user provides descriptions of various conditions that the inputs to a specific application need to satisfy. These descriptions may also be called "input-description-data."

The descriptions define the properties of valid input and necessarily the converse—the properties (i.e., characteristics) of invalid input. More specifically, the descriptions define the parameter boundaries of incoming data to a given application and define the assumptions for those parameters (delimited by the boundaries). Although the defined descriptions could apply to multiple applications, they are primarily intended for filtering input to a specific application.

The user may obtain these descriptions from information provided with an application, provided by a third party (e.g., an independent software vendor, a trade magazine), and/or manually prepared by a user. Alternatively, this description may be automatically generated by examining available source code, if any. However, this option is typically not available to users because the source code of applications is typically not available.

In the exemplary filter generator, the graphical UI 172 is, generally speaking, a traditional easy-to-use graphic UI of the point-and-click variety. Many operating systems provide an environment in which such a graphic UI may be implemented. Examples of such operating systems include Microsoft® Windows® XP, Microsoft® Windows® 2000, Microsoft® Windows® 98, Microsoft® Windows® 95, Microsoft® Windows® ME, and Microsoft® Windows NT® 4.0.

The graphical UI 172 of FIG. 1 shows a representation of a window containing traditional means of gathering information in such a UI. For example, there may be radio buttons, drop-down lists, check boxes, data entry boxes, and the like. Note that this technique is completely unlike the conventional instruction writing technique illustrated in dashed box 150 of FIG. 1. It is more efficient, quicker, easier, and less prone to errors than the conventional technique.

Description Representation Synthesizer

The DR synthesizer 176 takes the descriptions provided by the user via the graphical UI 172 and generates "description representations," which are intermediate representations of the description provided by the user. This process may also be called a transformation. The description representations represent the descriptions of the parameter boundaries and assumptions provided by the user via the graphical UI 172.

This may also be called "formal description." In the exemplary filter generator, the format for the description representations is in XML (extensible Markup Language). More specifically, a small subset of XML may be employed. This small subset may be particularly aimed at better readability (as text) even without the use of any specialized tools or preliminary XML knowledge on the user's part.

The DR synthesizer 176 generates the description representations and provides them to the filter instruction auto-generator 180. The exemplary filter generator may temporally or permanently store the description representations in a storage system. These stored description representations may be modified manually as the user sees fit.

Alternatively, a user may manually create the description representations independent of the graphical UI 172 and the DR synthesizer 176. These independently created description representations may be sent to filter instruction auto-generator 180.

Filter Instruction Auto-Generator

Collectively, the DR parser 182 and the instruction synthesizer 184 form the filter instruction auto-generator 180. The auto-generator 180 outputs an instruction, such as instruction 174. That instruction implements the filtering as defined by the original descriptions provided by the user via the UI 172.

Collectively, the DR parser 182 and the instruction synthesizer 184 translate the description representations into a set of instructions. The details of the implementations of these components depend heavily on the format of the description representations and the chosen filtering language. With the descriptions and examples provided herein, those of ordinary skill in the art can implement these components. More specifically, it will take, at least, an order of magnitude less time and effort for those of ordinary skill in the art to come up with and implement these components, as compared to the situation where the instruction has to be written manually in some special language.

The filter instruction auto-generator 180 may be pre-configured for each application and each filter type. Consequently, the filter instruction auto-generator 180 interprets and translates the description representation into a given set of filtering instructions on a given incoming parameter list.

Therefore, the running time of the exemplary filter generator does not add any overhead to the application's execution time.

Alternatively, the exemplary filter generator may be implemented without the DR synthesizer 176 and the DR parser 182. Instead, the filter instruction auto-generator 180 may generate the instructions directly from the information provided by the user via the graphical UI 172.

Automatically Generated Filter Instructions

The filter instruction auto-generator 180 generates the automatically generated ("autogen") filter instructions 174. As shown in FIG. 1, the autogen filter instructions 174 are sent to and effectively become the input filter 132. Upon the receipt of input, the autogen filter instructions are executed before the actual application receives that input. This performs the task of checking if all specified assumptions (extracted from the given formal description) have been met and takes appropriate steps (e.g., alerting the administrator, filtering out inappropriate input).

Depending on the particular type of filter necessary, different filtering languages may be applicable. For example, a filtering language often used in server application space is VBScript, JavaScript, C, and C++. But, for other configurations, other specially tailored (e.g., firewall, API wrapper) languages may be utilized. For additional implementation details on the components of the exemplary filter generator and the set of filter instructions, see the section below titled "Other Implementation Details".

Input Filter

The filter instruction set delimits the parameters and defines the set of assumptions to test. When running the instruction set, the input filter decides whether the input satisfies the set of assumptions.

For example, assume that it is desirable to filter incoming URL requests. The filtering instruction set is registered as a COM object, and called by a "wrapper" ISAPI DLL when the URL is received. The instruction obtains the URL string. The (URL) string is then parsed into an array of parameters, according to the parameter boundary descriptions, as specified in the description representations and implemented in the set of instructions. Each of the parameters is tested to make sure it satisfies the assumptions, outlined in the description representations and implemented in the instructions. The output of the instructions specifies which assumptions (if any) have been violated.

If any assumptions have been violated, the filter may perform some kind of "filtering" action. For example, it may choose to refuse to pass the input to the application, or may modify the input to ensure that the assumption holds. It may send a notification to the system administrator. Alternatively, it may do anything else of the like.

Methodological Implementation of the Exemplary Filter Generator

Figure 2:
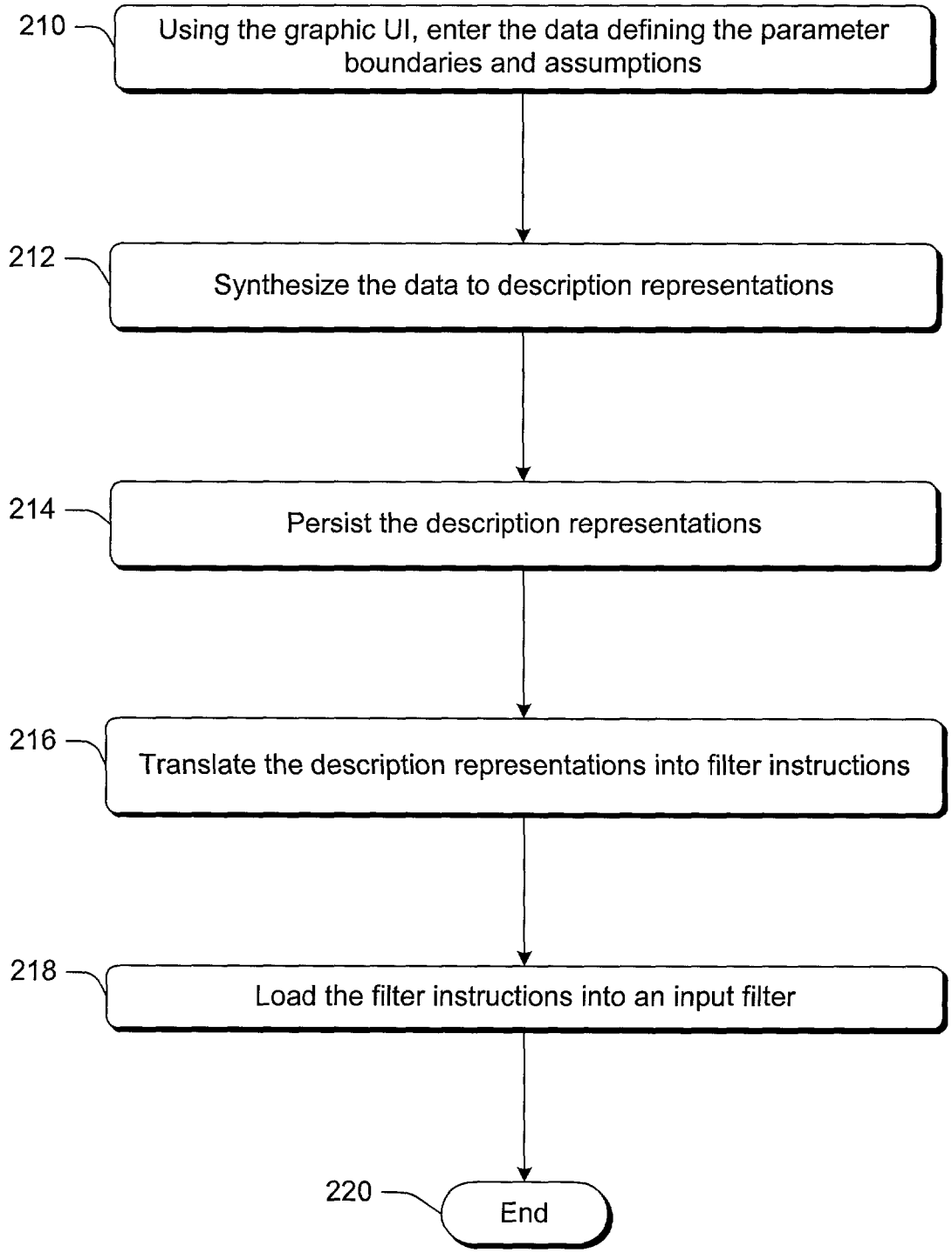
FIG. 2 is a flow diagram showing an illustrative methodological implementation of the invention herein.

FIG. 2 shows methodological implementation of the exemplary filter generator performed by the filter generation system 170 (or some portion thereof). This methodological implementation may be performed in software, hardware, or a combination thereof.

At 210, a user enters data thus defining the parameter boundaries and assumptions. This data may be the "descriptions." The user does this via a graphical UI, such as the UI 172 of FIG. 1. At 212, the exemplary filter generator synthesizes the descriptions to generate the description representations and these are persisted (e.g., stored) at 214. Again, the exemplary filter generator employs an XML data structure for the description representations.

At 216 of FIG. 2, the exemplary filter generator translates the description representations into filter instructions. This translation typically includes a parsing of the description representation and a synthesis of the filter instruction. This process may be customized and streamlined by pre-configuring the translator for known applications and filter types; for example, if the filter instructions are described in a compiled language such as C++, this process may include automatically invoking the compiler and linker on the filter instructions.

At 218, the just-generated filter instructions are loaded into and effectively become the input filter, such as filter 132 of FIG. 1. In other words, the host system using the filter feeds the input (acquired in block 210 of FIG. 2) into the filtering instructions. Consequently, the instructions delimit the parameters and define the set of assumptions to test. When running the instructions, the input filter decides whether the input satisfies the set of assumptions. The process ends at 220.

Exemplary Computing System and Environment

FIG. 3 illustrates an example of a suitable computing environment 900 within which an exemplary filter generator, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary filter generator may be implemented with numerous other general-purpose or special-purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary filter generator may be described in the general context of computer-executable instructions, such as program modules, being executed by a computer. Generally, program modules include routines, programs, objects, components, data structures, etc. that perform particular tasks or implement particular abstract data types. The exemplary filter generator may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 3 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of an input filter, an application program module, an input filter module, an instruction, an interface, a filter-instruction automatic generator ("autogen"), a synthesizer, and a memory.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary filter generator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 3 illustrates an example of a suitable operating environment 900 in which an exemplary filter generator may be implemented. Specifically, the exemplary filter generator(s) described herein may be implemented (wholly or in part) by any program modules 928–930 and/or operating system 926 in FIG. 3 or a portion thereof.

The operating environment is only an example of a suitable operating environment and is not intended to suggest any limitation as to the scope or use of functionality of the exemplary filter generator(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary filter generator may be stored on or transmitted across some form of computer readable media. Computer readable media can be any available media that can be accessed by a computer. By way of example, and not limitation, computer readable media comprises computer storage media.

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Other Implementation Details

This section describes additional details related to one or more exemplary implementations of the present invention.

Filtering Language

VBScript ("Visual Basic Scripting Edition") is the filtering language employed by exemplary filter generator. VBScript is based on the Visual Basic® (by the Microsoft Corporation) programming language, but is much simpler.

Of course, any other filtering language may be used, such as JavaScript. For that matter, any form of language may be used that is acceptable to an input filter, like filter 132 of FIG. 1.

Representation Format

XML (eXtensible Markup Language) is the description representation format employed by the exemplary filter generator. XML is an emerging standard for common representation of data in transit and it is especially touted for use in distributed applications. It can be viewed as generic enough to allow the representation of structures of any kind and for any purpose. It is extensible (unlike HTML), giving users the power to define their own tags for data types, attributes, and names.

The actual XML tag structures may be checked against their intended use, which can be pre-defined in a separate Document Type Definition ("DTD"). This guards against occasional misspellings or omissions of key structural components, thus ensuring conformity between XML documents, intended to serve similar purposes. If no such DTD is provided, the parser may deem every tag and corresponding structure to be valid, enlisting the structure as a new one unless it completely coincides with another instance of the same structure encountered before.

DTDs are favorable because they automate a level of error control, having the parser check the encountered structures against their definitions in the corresponding DTDs. Similar benefits can be achieved by filling out the XML description representation (of assumptions) through a conveniently designed UI (of the exemplary filter generator). This reduces the chance of errors.

In the exemplary filter generator, the various types of filters may be described independently of one another, in different XML descriptions. This encapsulates and simplifies the design of each atomic filter, allowing their use as building blocks in more complicated settings (e.g., if multiple filters need to be chained together and applied to the inputs of the same application).

User Interface

The exemplary filter generator employs a mechanism where an intermediate data structure stores representations (e.g., the XML data structures) of the descriptions of the assumptions and parameter boundaries. Why do this instead of generating the appropriate set of filter instructions directly from the UI? Compatibility and interoperability.

There may be a variety of ways in which the administrator may choose to create or edit a filter description. Not strictly tying it to any particular UI, coupled with the wide acceptance of XML as an emerging standard for data interchange, are factors which allow for descriptions created on different systems running different software to still be compatible. Administrators across platforms may have access to different tools, yet they could choose their favorite way to create/edit a filter description in XML and would not lose interoperability by doing so. To avoid unnecessary changes to the UI even when new unwarranted assumptions are unveiled, the UI is modularized and detached from the generation of the XML description representation.

UI for Parsing Rules Descriptions. When administrators have the ability to define the "meaning" of input parameters, they are able to exercise strict control over which inputs are considered safe for an application. In the exemplary filter generator, this is accomplished by observing the input not as a set of delimited strings passed to an application, but rather as an unknown string of characters, which is to be delimited first into what would be the parameters. Thus, part of the skill goes into deciding how those parameters should be defined and deciding the correct and full set of assumptions on all parameters.

With the exemplary filter generator, the system administrator can focus her attention on deciding how those parameters should be defined rather than on how to write instructions.

For example, consider the following input request, an incoming URL request, to a web server:

http://www.foomusic.com/my-query?page=%2Fpop%2F&club=classical

Here is a possible break-up of this URL into parameters (for clarity we show them separated by spaces):

http://www.foomusic.com my-query page %2Fpop %2F club classical

There are many ways in which an administrator can define (i.e., delimit) the input parameters in a string like this. The more fine-grained the definitions are, the larger the number and the smaller the size of the parameters. This in turn would allow more precise handling of each separate parameter.

However, one can imagine defining other sets of parameters (presumably more coarse-grained, aiming at capturing larger contexts) on the same input string. In the end, when two or more (independent) sets of parameters are defined, along with the assumptions on each one, the corresponding filtering instructions can be executed on the given input string and the overall result would be the conjunction of the individual instruction results. This technique can be used when the complexity of the input string is expected to be high.

For example, here are two ways to define the boundary between one parameter and the next: by specifying a single-character end-delimiter of the current parameter, or by giving the exact length of that parameter. An exception to this rule is the very last parameter—running to the end of the input string—it is "delimited" by the NULL end-delimiter. (An end-delimiter character, if specified, is excluded from the extracted parameter.)

UI for Description of Assumptions. The parameters need to satisfy a set of assumptions. Desirable constraints may be expressed using a UI. In the description of assumptions, each assumption is specified either on a parameter itself (SELF) or on its size (SIZE). (The latter naturally only takes numerical values.)

The exemplary filter generator implements a set of thirteen relations (see Table 1). More or less may be used by different implementations.

TABLE 1

Example relations that may be used in defining assumptions on parameters

| Relation name | Relational semantics |
| --- | --- |
| CONSISTS | The parameter value as a string consists of a specified set of characters, e.g. a–z, 0–9, etc. |
| EXCLUDES | The parameter value as a string excludes a specified substring |
| ENDS_IN | The parameter value as a string ends in a specified string (suffix) |
| LE | The parameter value/size is less than or equal to a specified numerical constant |
| LT | The parameter value/size is less than a specified numerical constant |
| GE | The parameter value/size is greater than or equal to a specified numerical constant |
| GT | The parameter value/size is greater than a specified numerical constant |
| EQ | The parameter value/size is equal to a specified numerical constant |
| LEX_LE | The parameter value as a string lexicographically precedes or is equal to a specified string |

TABLE 1-continued

Example relations that may be used in defining assumptions on parameters

| Relation name | Relational semantics |
| --- | --- |
| LEX_LT | The parameter value as a string lexicographically precedes a specified string |
| LEX_GE | The parameter value as a string lexicographically succeeds or is equal to a specified string |
| LEX_GT | The parameter value as a string lexicographically succeeds a specified string |
| LEX_EQ | The parameter value as a string is lexicographically equal to a specified string |

Herein, relations may have a disjunctive meaning (i.e., there can be more than one specified constant on the right-hand side, delimited appropriately) with the parameter required to satisfy the relation with at least one of the specified constants.

Consider, for example, the sample URL request and parameters provided above. Below is a sample list of assumptions (in natural language) that one might wish to impose on the first few parameters:

Parameter 1 should consist of only lower-case alphabetical characters and should be "http" or "https"

Parameter 2 should be exactly 2 characters long and these should be "//"

Parameter 3 should be no more than 30 characters long, should consist of only lower-case alphabetical characters or the "period" character, and should have ".com" as suffix XML Description Representations The XML description of the assumptions consists of a set of clauses, each representing a single assumption. Semantically these clauses are AND-ed together to form a CNF (Conjunctive Normal Form) Boolean expression. Verifying that this expression is satisfied by the input data is equivalent to ensuring all stated assumptions have been met.

Representing assumptions naturally translates into CNF-expressions without the need for disjunction (OR) or negation (NOT) operations, which significantly simplifies the clause description in a formal language. There are a few notable exceptions, which do need a disjunction. For example, verifying if a parameter has its value—whether numeric or character string—among a list of given possibilities, and specifying a set of possible characters by which a parameter needs to be represented. All of these situations are handled without compromising the simplicity of the formal description format.

The formal description format described herein has been designed to be highly usable, striving toward a simpler and understandable XML file structure.

XML Parsing Rules Description. Below is a sample data structure of the XML description representations of parameter boundaries. XML parsing scheme description may be part of the results of using the exemplary filter generator to delimit the input request. It defines how input can be parsed into parameters using only a small uniform set of XML tags. Each parameter has its boundaries defined inside an instance of a <param> tag structure. This structure represents a collection of four substructures:

<number>—the parameter number (in order from left to right);

<function>—determining how the last (right-end) character of each parameter is determined—based on an exact parameter length in number of characters (LENGTH) or based on an end-delimiter character (END_DELIM);

<value>—depending on the value of <function>, contains either the parameter length or the end-delimiting character;

<desc>—(optional) concise natural-language description of the semantics of the current parameter.

Finally, the input to be parsed is merely a sequence of parameters, whose number has no a priori set upper bound. An example follows.

```
<input-parse>
    <param>
        <number>1</number>
        <function>END_DELIM</function>
        <value>:</value>
        <desc>Protocol name</desc>
    </param>
    <param>
        <number>2</number>
        <function>LENGTH</function>
        <value>2</value>
        <desc>Double slash, i.e. //</desc>
    </param>
    <param>
        <number>3</number>
        <function>END_DELIM</function>
        <value>/</value>
        <desc>Server name</desc>
    </param>
    <!-- The definitions of parameters 4–7 have been omitted for
    brevity -->
    <param>
        <number>8</number>
        <function>END_DELIM</function>
        <value>NULL</value>
        <desc>Second (real) parameter value</desc>
    </param>
</input parse>
```

Reading the above XML description, parameter 1 (semantically, the protocol name) starts from the beginning of the input string and ends before the first colon character. Then, parameter 2 (meant to be the delimiting double slash after the protocol name) picks up immediately after the colon and is exactly 2 characters long. Parameter 3 (supposed to contain a server name) starts immediately after parameter 2 and continues until the next slash-character in the input, etc. Parameter 8 (in the sample meant to hold the value of the "club" property) starts (naturally) after parameter 7 and is comprised of all characters until the end of the input string is reached.

Description of Assumptions. Below is a sample data structure of the XML description representations of assumptions—the output from the corresponding UI on the same sample URL request. Various assumptions on input data (parameters) could again be described using a very limited uniform set of XML tags.

```
<param>
    <number>1</number>
    <func>SELF</func>
    <cond>CONSISTS</cond>
    <delim>NULL</delim>
    <value>a-z</value>
    <desc>Parameter 1 should consist of only lower-case alphabetical
characters</desc>
</param>
<param>
    <number>1</number>
    <func>SELF</func>
    <cond>LEX_EQ</cond>
    <delim>,</delim>
    <value>http ,https</value>
    <desc>Parameter 1 should be one of the strings "http" or
    "https"</desc>
</param>
<param>
    <number>2</number>
    <func>SIZE</func>
    <cond>EQ</cond>
    <delim>NULL</delim>
    <value>2</value>
    <desc>Parameter 2 should be exactly 2 characters long</desc>
</param>
<param>
    <number>2</number>
    <func>SELF</func>
    <cond>LEX_EQ</cond>
    <delim>NULL</delim>
    <value>//</value>
    <desc>Parameter 2 should be the string "//"</desc>
</param>
<param>
    <number>3</number>
    <func>SELF</func>
    <cond>CONSISTS</cond>
```

```
            <delim>, </delim>
            <value>a–z, .</value>
            <desc>Parameter 3 should consist of lower-case alphabetical characters and
".”</desc>
    </param>
    <param>
            <number>3</number>
            <func>SIZE</func>
            <cond>LE</cond
            <delim>NULL</delim>
            <value>30</value>
            <desc>Parameter 3 should be at most 30 characters long</desc>
    </param>
    <param>
            <number>3</number>
            <func>SELF</func>
            <cond>ENDS_IN</cond>
            <delim>NULL</delim>
            <value>. com</value>
            <desc>Parameter 3 should end with the string ".com"</desc>
    </param>
```

As the above example illustrates, each assumption on a parameter is described within a separate <param> tag structure. This structure is comprised of six tags:
  <number>—the number (in order from left to right) of the parameter to which the assumption applies;
  <func>—the parameter function, determining whether the current assumption concerns the parameter value (SELF), or its size in number of characters (SIZE);
  <cond>—the relation between parameter value/size (depending on the function) and the list of constants specified in the <value> tag;
  <delim>—a single character delimiting constants in the <value> list (if the list contains a single constant, a NULL delimiter should be specified);
  <value>—a list of one of more constants being related to the parameter value/size by the function;
  <desc>—(optional) concise natural-language description of the semantics of the current assumption.

Rather than include a <value-type> tag in the XML structure, separate relations are defined for each type domain of possible arguments to simplify the design and avoid ambiguities. For example, GT expects a numerical argument (an integer or a floating-point number), while LEX_GT expects a character string to be lexicographically compared to the parameter.

If the <value> list contains more than one constant, all subsequent constants should be of the same type as the first one. For instance, the relation EQ expects one or more numerical values, all necessarily of the same type. An advantage of using a GUI to generate the intermediate XML descriptions is that this approach gives the benefit of automatic type checking at description-generation time.

When there are two or more constants in the list, the relation has the semantics of a disjunction between a set of relations, each one between the parameter value/size and the next constant in the list. In other words, the parameter in question satisfies the specified relation with the list if it does so with at least one of the constants in the list. For instance, the second assumption (in the XML above) demands that parameter 1 be lexicographically equal to one of http or https, while the fifth assumption states that parameter 3 should consist of characters from the set of letters a–z and the "." character.

These two options—checking if a parameter has its value among a list of values, and specifying the allowable character set for representing a parameter—are the only situations when a disjunction operator is involved in specifying assumptions. Even so, they can be easily handled in the implementation without compromising the simplicity of the model, in which each assumption corresponds exactly one clause and the set of assumptions is a set of clauses joined by conjunction.

The constants in the <value> list are represented according to the rules of XML; e.g., an ampersand character should be &, a less-than character should be <, etc. The exemplary filter generator facilitating the description generation takes care of this.

Server Filter

Filters are described in a structure such as<server-filter>. It specifies:
  <param-count>—the total number of parameters;
  <max-total-length>—the maximum allowed length of the application input (as it is given initially before being parsed into its constituent parameters);
  <param-desc>—(optional) concise natural language description of the parameter semantics;
  one or more <param> structures (as described above), each one describing an assumption on some parameter;
  zero or more <complex-cond> structures, each one "pointing" to an XML file and an optional description (a more in-depth discussion follows shortly).

Here is an example of a <server-filter> structure:

```
<server-filter>
    <param-count>8</param-count>
    <max-total-length>100</max-total-length>
    <param-desc>
    See the XML parsing schema descriptions</param-desc>
    <!-- Definitions of assumptions on parameters are omitted here -->
    <complex-cond>
        <xml-file>MoreComplex.xml</xml-file>
        <cond-desc>Some more complex assumptions</cond-desc>
    </complex-cond>
</server-filter>
```

Complex assumptions are specified in dedicated XML files, referred to by an<xml-file> tag inside the <complex-cond> structure (as in the above example). They are a special provision for making the model extensible by adding a level of indirection, which saves us from having to change the core XML format and/or the filter-generating code. They also allow any additions to the filter formats to happen incrementally (i.e., as more reports and exploits become known) and with ensured backward compatibility. Thus, assumptions which otherwise would not fit into the above-described structure can still be described, albeit in separate XML files.

Filter Generator

The filter instruction generator (such as filter instruction auto-generator 180) parses the input (XML) descriptions of parameter boundaries and assumptions on those parameters, and (depending on the type of filter, e.g. <server-filter> denotes back-end server filters) synthesizes a set of instructions (in an appropriate language), which can then be executed by a filter on an incoming input string in order to determine if the assumptions on the specified set of parameters all hold.

The instruction set generation process of the exemplary filter generator is completely detached from the real-time processing of incoming requests of the filter. In other words, the instruction set can be generated entirely offline; and thus performance is not an issue for the generation.

Filtering Instructions

A filtering instruction set is registered as a COM object, then invoked by the server via an ISAPI DLL. Alternatively, the filtering instruction set may be the index.html file, which a browser opens first when a URL comes in.

The resulting filter obtains the input (URL) line and parses it into a set of parameters. Assumptions are then verified against the delimited parameters and a conclusion is reached on whether all of the assumptions have been satisfied or whether some have failed and which ones, if so.

Exemplary Applications of the Exemplary Filter Generator

One application of the exemplary filter generator is in providing express response to security breaches through the dissemination of filtering instruction sets while the next set of security patches are still under development. This can save time, money, and reputation for the vendor of the application under attack. In many cases, where a security breach involves a simple omission of an input verification—and these have accounted for a large fraction of recent attacks—it could literally take a security expert minutes to come up with the right set of parameters and assumptions on them to generate a filtering script.

Furthermore, this can be accomplished without knowing the details of the application's source code and even without having access to it. Consequently, not only the application vendor will be able to supply filters, although there is value in knowing that a specific filtering script was distributed by a trusted party. The resulting script can ensure that attempts to exploit the same vulnerability will be fended off reliably in the future.

As a comparison, it can take weeks and even months (of analyzing, developing and testing) before a reliable patch to a widely deployed commercial software product is ready for distribution. In the case of legacy software, no longer supported by its original vendor, patches will likely never come out; however, filters would be quite easy and inexpensive to create and distribute.

Another application is the automatic generation of firewall filters. Generalized firewall configuration languages have been proposed; a further step might be to automate the generation of configuration instructions in such a language using GUI-based tools.

Still another application is the encapsulation of existing API function libraries. The idea is that the wrapper filter would intercept the calls to its library routines, do the necessary validation checks and only "forward" the calls to the corresponding functions if it is safe to do so. When a vulnerability is found, the appropriate wrapper filter could be generated and applied as a stopgap until an OS or application patch is fully tested and released. In fact, application programmers could perhaps specify at development time the assumptions made by their code about its inputs, and generate the appropriate filters themselves. Then an administrator could decide, based on the hostility of the environment, the sensitivity of the application, and the performance constraints on the system, whether the filter should be installed to improve security or omitted to address performance.

CONCLUSION

Although the invention has been described in a language specific to structural features and/or methodological steps, it is to be understood that the invention defined in the appended claims is not necessarily limited to the specific features or steps described. Rather, the specific features and steps are disclosed as preferred forms of implementing the invention.

The invention claimed is:

1. A method for automatic production of one or more sets of instructions for an input filter of a computer system, the method comprising:
obtaining input-description-data, which define properties of valid input directly provided by a computing component without human intervention;
transforming the input-description-data into a data structure, wherein the data structure is an organized representation of the input-description-data and the data structure is embodied on a computer-readable storage media;
from the organized representation of the input-description-data of the data structure, automatically generating a set of instructions for filtering input directly provided by the computing component without human intervention based upon the properties of valid input defined by the input-description-data, wherein the properties of valid input indicate parameters of input by defining boundary delimitations of parameters and define assumptions regarding parameters, the generating further comprises:
parsing the data structure to extract the input-description-data organized in the data structure;
synthesizing the set of instructions based upon the input-description-data extracted by the parsing, the synthesizing comprising translating the organized representation of the input-description-data of the data structure into the set of instructions.

2. A method as recited in claim 1, wherein the data structure is in a hierarchical markup language.

3. A method as recited in claim 1, wherein the set of instructions as an input filter.

4. A method as recited in claim 1 further comprising loading the set of instructions as an input filter.

5. A method as recited in claim 1, wherein the set of instructions is generated with regard to filtering input for an application program module.

6. A method as recited in claim 1, wherein input-description-data define the properties of input selected from a group consisting of valid input only, invalid input only, and both valid and invalid input.

7. A method as recited in claim 1, wherein during the obtaining, input-description-data is obtained from a user via a graphical user interface.

8. A computer system comprising:
a memory comprising one or more program modules comprised of computer-executable instructions; and
a processor coupled to the memory, the processor being configured to execute the one or more program modules, which comprise:
an application program module configured to receive and respond to input provided by a computing component;
an input filter module configured to receive input provided by the computing component for the application program module, filter the input, and pass the filtered input to the application program module, wherein the filter comprise one or more sets instructions that, when executed, filter the input and sets of instructions being automatically produced according to the method as recited in claim 1.

9. A computer system as recited in claim 8, wherein the computer system comprises a Web server.

10. A computer system as recited in claim 8, wherein the input filter module is further configured to receive input from the computing component via a communications network.

11. A computer-readable storage medium comprising a set of instructions for filtering input, wherein the set of instructions has been automatically produced by the method as recited in claim 1.

12. An input filter stored in a computer having computer executable instructions that, when executed, filter input, wherein said computer executable instructions were automatically produced by the method as recited in claim 1.

13. A computer comprising one or more computer-readable storage medias having computer-executable instruction that, when executed by the computer, perform the method as recited in claim 1.

14. A computer-readable storage medium having computer-executable instructions that, when executed by a computer, performs the method as recited in claim 1.

15. A method facilitating speedy and production of one or more sets of instructions for an input filter of a computer system, the method comprising:
obtaining input-description-data, which defined properties of valid input provided by a computing component without human intervention;
transforming the input-description-data into a data structure, wherein the data structure is an organized representation of the input-description-data and the data structure is embodied on a computer-readable storage media;
storing the data structure in a persistent form;
from the organized representation of the input-description-data of the data structure, automatically generating a set of instructions for filtering input directly provided by the computing component without human intervention based upon the properties of valid input defined by the input-description-data, wherein the properties of valid input indicate parameters of input by defining boundary delimitations of parameters and define assumptions regarding parameters, the generating further comprises:
parsing the data structure to extract the input-description-data organized in the data structure;
synthesizing the set of instructions based upon the input-description-data extracted by the parsing, the synthesizing comprising translating the organized representation of the input-description-data of the data structure into the set of instructions.

16. A method as recited in claim 15, wherein the data structure is in a hierarchical markup language.

17. A method as recited in claim 15 further comprising loading the set of instructions as an input filter.

18. A method as recited in claim 15, wherein during obtaining, the input-description-data is obtained from a user via a graphical user interface.

19. A computer-readable storage medium comprising a set of instructions for filtering input, wherein the set of instructions has been automatically produced by the method as recited in claim 15.

20. An input filter stored in a computer having computer executable instructions that, when executed, filter input, wherein said computer executable instructions were automatically produced by the method as recited in claim 15.

21. A computer system comprising:
a memory comprising one or more program modules comprised of computer-executable instructions; and a processor coupled to the memory, the processor being configured to receive and response to input provided by a computing component;
an input filter module configured to receive input provided by a computing component for the application program module, filter the input, and pass the filtered input to the application program module, wherein the filter comprises one or more sets of instructions that, when executed , filter the input, and said sets instructions being automatically produced according to the method as recited in claim 15.

22. A computer system as recited in claim 21, wherein the computer system comprises a Web server.

23. A computer system as recited in claim 21, wherein the input filter module is further configured to receive input from the computing component via a communications network.

24. A computer comprising one or more computer-readable storage media having computer-executable instructions that, when executed by the computer, perform the method as recited in claim 15.

25. A computer-readable storage medium having computer-executable instructions that, when executed by a computer, performs the method as recited in claim 15.

26. An automatic filter-instructions production system comprising:
an user interface for obtaining input-description-data, which define properties of valid input provided by a computing component;
a transformer configured to transform the input-description-data into a data structure, wherein the data structure is an organized representation of the input-description-data and the data structure is embodied on a computer-readable storage media;
a memory, wherein the memory is configured to store the data structure;
a filter-instructions automatic generator ("autogen") configured to automatically generate from the organized representation of the input-description-data of the data structure a set of instructions for filtering input provided by the computing component based upon the properties of valid input defined by the input-descripton-data, wherein the filter-instructions autogen is further configured to acquire the properties from the data structure when automatically generating the set of instructions, wherein the properties of valid input indicate parameters of input by defining boundary delimitations of said parameters and define assumptions regarding parameters,

29 the autogen being further configured to:

parse the data structure to extract the input-description-data organized in the data structure;

synthesize the set of instructions based upon the input-description-data extracted by the parsing, wherein when synthesizing the autogen is configured to translate the organized representation of the input-description-data of the data structure into the sets of instructions.

27. A computer-readable storage medium comprising a set of instructions for filtering input, wherein the set of instructions has been automatically produced by the system as recited in claim 26.

28. An input filter stored on a computer having computer executable instructions that, when executed, filter input, wherein said computer-executable instructions were automatically produced by the system as recited in claim 26.

29. A system as recited in claim 26, wherein the interface is a graphical user interface.

30. A system for facilitating the production of one or more sets of instructions, the system comprising:

a memory comprising a set of computer program instructions;

a processor coupled to the memory, the processor being configured to execute the computer program instructions, which comprise:

obtaining input-description-data, which define properties of valid input provided by a computing component;

30 transforming the input-description-data into a data structure, wherein the data structure is an organized representation of the input-descriptor-data and the data structure is embodied on a computer-readable storage media;

storing the data structure in a persistent form; from the organized representation of the input-description-data of the data structure, automatically generating a set of instruction for filtering input provided by the computing component based upon the properties of valid input defined by the input-description-data, wherein the generating acquires the properties for generating the set of instructions from the data structure, wherein the properties of valid input indicate parameters of input by defining boundary delimitations of parameters and define assumptions regarding parameters, the generating further comprises:

parsing the data structure to extract the input-description-data organized in the data structure;

synthesizing the set of instructions based upon the input-description-data extracted by the parsing, the synthesizing comprising translating the organized representation of the input-description-data of the data structure into the set of instructions.

* * * * *